United States Patent [19]

Jung et al.

[11] Patent Number: 4,988,760
[45] Date of Patent: Jan. 29, 1991

[54] SOLUBLE CROSSLINKABLE ACRYLATE COPOLYMER, PROCESSES FOR ITS PREPARATION AND COATING AGENTS BASED UPON THE ACRYLATE COPOLYMER

[75] Inventors: Werner Jung, Ascheberg; Axel Sievers, Münster, both of Fed. Rep. of Germany

[73] Assignee: BASF Lacke & Farben Aktiengesellschaft, Münster, Fed. Rep. of Germany

[21] Appl. No.: 449,295

[22] Filed: Dec. 5, 1989

Related U.S. Application Data

[63] Continuation of Ser. No. 57,921, May 29, 1987, abandoned.

[30] Foreign Application Priority Data

Sep. 30, 1985 [DE]  Fed. Rep. of Germany ....... 3534874

[51] Int. Cl.$^5$ .............................................. C08L 39/00
[52] U.S. Cl. ................................. 524/555; 525/328.2; 525/379; 526/304; 526/301; 526/223
[58] Field of Search ..................... 524/555; 525/328.2, 525/379; 526/304, 301, 273

[56] References Cited

U.S. PATENT DOCUMENTS

| 4,250,243 | 2/1981 | Yoshida et al. | 430/215 |
| 4,289,676 | 9/1981 | Czauderna et al. | 524/555 |
| 4,401,794 | 8/1983 | Oriel et al. | |
| 4,522,973 | 6/1985 | Ley et al. | 526/304 |
| 4,593,078 | 6/1986 | Kooymans et al. | |

OTHER PUBLICATIONS

"Activated Carboxylic Esters, a New Crosslinking Technology" D. A. Ley, Science Eng., 1984 vol. 50 pp. 353–356.

Primary Examiner—Joseph L. Schofer
Assistant Examiner—N. Sarofin
Attorney, Agent, or Firm—Kenyon & Kenyon

[57] ABSTRACT

The invention relates to a soluble, cross-linkable acrylate copolymer which is obtainable by copolymerization of more than 3 to 30% by weight of monomers having at least two polymerizable, olefinically unsaturated double bonds, from 5 to 50% by weight of monomers having a cross-linkable group, with the exception of hydroxyl groups and carboxyl groups, and from 20 to 92% by weight of further monomers having a polymerizable, olefinically unsaturated double bond, the sum of the monomers being 100% by weight. The invention furthermore relates to processes for the preparation of acrylate copolymers and coating agents based on the acrylate copolymers according to the invention.

15 Claims, No Drawings

SOLUBLE CROSSLINKABLE ACRYLATE COPOLYMER, PROCESSES FOR ITS PREPARATION AND COATING AGENTS BASED UPON THE ACRYLATE COPOLYMER

This application is a continuation of application Ser. No. 057,921, filed May 29, 1987 now abandoned.

The invention relates to soluble acrylate copolymers, obtainable by copolymerization of monomers having at least two polymerizable, olefinically unsaturated double bonds, monomers having at least one crosslinkable group and further polymerizable monomers.

EP-A-103 199, which constitutes a generic type, discloses an acrylate copolymer which is obtained by copolymerization of from 10 to 95% by weight of tert-butyl acrylate, from 0.1 to 3% by weight of polyfunctional monomers, such as, for example, trimethylolpropane triacrylate, from 1 to 30% by weight of comonomers having a functional crosslinkable group and from 0 to 80% by weight of further polymerizable, ethylenically unsaturated monomers. Carboxyl-containing and hydroxyl-containing monomers may be mentioned as comonomers having a functional crosslinkable group. The branched acrylate copolymers are crosslinked with polyepoxides or etherified amino-formaldehyde resins. The advantages of the coating compositions according to EP-A-103 199 are that the coatings obtained from them have good moisture resistance, and that the coating compositions can have a high solids content.

It was the object of the present invention to improve the properties of the coating agents or of the coatings based on acrylate copolymers with respect to resistance to long-term exposure to chemicals and solvents, the resistance to gasoline, the flexibility of the coatings obtained from the coating agents, the corrosion resistance and the resistance to long-term exposure to water and steam. The compositions should cure, if necessary, at room temperature or at a slightly elevated temperature so that they can be used, for example, in automotive refinishing. Furthermore, for reasons including economic ones, it should be possible to obtain a curable coating agent having a high solids content coupled with a relatively low viscosity. This object is achieved, surprisingly, by a soluble acrylate copolymer which has a higher content of copolymerized, ethylenically polyunsaturated monomers than the acrylate resins described in EP-A-103 199. Compared with linear acrylate resins and the acrylate resins described in EP-A-103 199, a lower viscosity coupled with a relatively high solids content can be obtained in the case of the acrylate copolymers according to the invention. Only by employing the reaction conditions according to the invention during the copolymerization is it possible to incorporate amounts of more than 3% by weight of polyunsaturated monomers in the acrylate resin. Because of the highly branched structure of the copolymer, the functional groups of the resin are more reactive, which is a great advantage.

The object of the invention is achieved by the soluble acrylate copolymer stated at the outset, which is obtainable from (a1) more than 3 to 30% by weight, preferably from 5 to 25% by weight, of monomers having at least two polymerizable, olefinically unsaturated double bonds, (a2) from 5 to 50% by weight, preferably from 10 to 35% by weight, of monomers having a crosslinkable group, with the exception of hydroxyl and carboxyl groups, and (a3) from 20 to 92% by weight of further monomers having a polymerizable, olefinically unsaturated double bond, the sum of a1, a2 and a3 being 100% by weight.

The monomers of component a2 are comonomers known from the literature and possessing any crosslinkable functional group apart from hydroxyl and carboxyl groups. U.S. Pat. No. 4,401,794 discloses a polymer which is obtained from isocyanatoalkyl esters of an unsaturated carboxylic acid and other polymerizable monomers. This polymer containing isocyanate groups is cured with water. EP-B-20 000 discloses polymers obtained from monomers having activated ester groups, for example methyl acrylamido glycolate. Suitable crosslinking agents for these polymers are compounds having at least two primary or secondary amino groups per molecule. Curing can be carried out at temperatures from about room temperature to about 200° C. German Auslegeschrift No. 2,064,916 discloses a process for the preparation of heat-curable powders, in which the powder consists of a copolymer containing epoxide groups and a crosslinkable compound containing carboxyl or amino groups.

According to the invention, compounds of the general formula

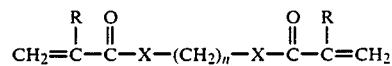

in which
R denotes H or CH$_3$,
X denotes O, NR', where R' denotes H, alkyl or aryl, or S and
n denotes 2 to 8,
can be used as component a1.

Examples of such compounds are hexanediol diacrylate, hexanediol dimethacrylate, glycol diacrylate, glycol dimethacrylate, butanediol diacrylate, butanediol dimethacrylate, trimethylolpropane triacrylate and trimethylolpropane trimethacrylate. Combinations of these polyunsaturated monomers can of course also be used. Divinylbenzene is also suitable as component a1.

Furthermore, component a1 may advantageously be a reaction product of a carboxylic acid having a polymerizable, olefinically unsaturated double bond and glycidyl acrylate and/or glycidyl methacrylate, or an unsaturated monocarboxylic acid or a polycarboxylic acid which is esterified with an unsaturated alcohol.

A reaction product of a polyisocyanate and an unsaturated alcohol or amine may also advantageously be used as component a1. The reaction product of one mole of hexamethylene diisocyanate and 2 moles of allyl alcohol may be mentioned as an example of this.

Another advantageous component a1 is a diester of polyethylene glycol and/or polypropylene glycol having a mean molecular weight of less than 1500, preferably of less than 1000, and acrylic acid and/or methacrylic acid.

The further polymerizable monomers of component a3 can advantageously be selected from the group consisting of styrene, vinyltoluene, alkyl esters of acrylic acid and methacrylic acid, alkoxyethyl acrylates and aryloxyethyl acrylates and the corresponding methacrylates, and esters of maleic and fumaric acid. Methyl acrylate, ethyl acrylate, propyl acrylate, butyl acrylate, isopropyl acrylate, isobutyl acrylate, pentyl acrylate, isoamyl acrylate, hexyl acrylate, 2-ethylhexyl acrylate, octyl acrylate, 3,5,5-trimethylhexyl acrylate, decyl acrylate, dodecyl acrylate, hexadecyl acrylate, octadecyl acrylate, octadecenyl acrylate, pentyl methacrylate, isoamyl methacrylate, hexyl methacrylate, 2-ethylbutyl methacrylate, octyl methacrylate, 3,5,5-trimethylhexyl methacrylate, decyl methacrylate, dodecyl methacrylate, hexadecyl methacrylate, octadecyl methacrylate, butoxyethyl acrylate, butoxyethyl methacrylate, methyl methacrylate, ethyl methacrylate, propyl methacrylate, isopropyl methacrylate, butyl methacrylate, cyclohexyl acrylate, cyclohexyl methacrylate, acrylonitrile, methacrylonitrile, vinyl acetate, vinyl chloride and phenoxyethyl acrylate may be mentioned as examples. Other monomers may be employed, provided that they do not lead to undesirable properties of the copolymer. The choice of component a3 depends substantially on the desired properties of the acrylate copolymer with respect to flexibility, hardness, compatibility and polarity. Some of these properties can be controlled by means of the known glass transition temperatures of the monomers.

Monomers containing isocyanate groups are advantageous monomers of component a2. Particularly preferred monomers of this type are isocyanatoalkyl esters of unsaturated carboxylic acids which correspond to the general formula

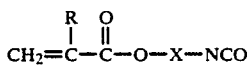

in which
R denotes H, $CH_3$ or $C_2H_5$ and
X denotes $-(CH_2)_{1-12}-$.

Isocyanatoethyl acrylate and isocyanatoethyl methacrylate may be mentioned as examples. Other suitable monomers containing isocyanate groups are, for example, vinyl isocyanate and 1:1 reaction products of diisocyanates with monomers possessing active hydrogen. An example of this is the 1:1 reaction product of isophorone diisocyanate with a hydroxyl-containing monomer.

The monomers of component a2 can particularly preferably be monomers which contain activated ester groups and correspond to the general formula below:

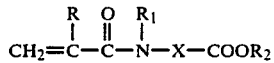

in which
R = M or methyl,
$R_1$ = alkyl or aryl,
$R_2$ = alkyl and

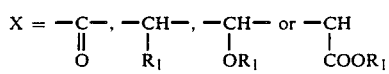

Methyl acrylamidoglycolate methyl ether may be particularly preferably mentioned in this case. Other monomers carrying activated ester groups are methyl acrylamidoglycolate and methyl methacryloxyacetate.

The monomers of component a2 may furthermore be alkoxymethylacrylamides or alkoxymethylmethacrylamides of the general formula

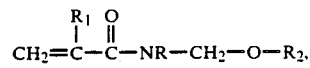

wherein
$R_1$ denotes H or methyl,
$R_2$ denotes H or alkyl and
R denotes H, alkyl or aryl.

If monomers having an activated ester group or alkoxymethylacrylamides or alkoxymethylmethacrylamides are incorporated as copolymerized units in the soluble acrylate copolymer according to the invention, up to 10% by weight, based on the total weight of all monomers, of hydroxyl-containing monomers and/or up to 5% by weight, based on the total weight of all monomers, of carboxyl-containing monomers can be incorporated into the acrylate copolymer as further copolymerized monomers having a polymerizable, olefinically unsaturated double bond.

Monomers which contain glycidyl groups may be mentioned as monomers possessing a group capable of undergoing crosslinking. The monomers of component a2 which contain glycidyl groups are preferably glycidyl esters of unsaturated carboxylic acids or glycidyl ethers of unsaturated compounds. The following may be mentioned as examples: glycidyl acrylate, glycidyl methacrylate, glycidyl esters of maleic and fumaric acid, glycidyl vinyl phthalate, glycidyl allyl phthalate and glycidyl allyl malonate.

The invention furthermore relates to processes for the preparation of the soluble acrylate copolymers according to the invention, wherein, to prepare the acrylate copolymers, (a1) more than 3 to 30% by weight, preferably from 5 to 25% by weight, of monomers having at least two polymerizable, olefinically unsaturated double bonds, (a2) from 5 to 50% by weight, preferably from 10 to 35% by weight, of monomers having a crosslinkable group, with the exception of hydroxyl and carboxyl groups, and (a3) from 20 to 92% by weight of further monomers having a polymerizable, olefinically unsaturated double bond, the sum of a1, a2 and a3 being 100% by weight, are copolymerized in an organic solvent at from 80° to 130° C., preferably from 90° to 120° C., using at least 0.5% by weight, preferably at least 2.5% by weight, based on the total weight of the monomers, of a polymerization regulator and using polymerization initiators, to give a pre-crosslinked, non-gelled product. Using the polymerization conditions according to the invention, it is possible, surprisingly, to prepare a clear, transparent, non-gelled solution of a branched copolymer. The use of monomers having at least two ethylenically unsaturated groups results in precrosslinking of the copolymer molecules, which, owing to the special reaction conditions according to the invention, nevertheless does not lead to gelled products.

Compounds containing mercapto groups are advantageously used as polymerization regulators. In this context, care should be taken to ensure that, when an acrylate copolymer containing isocyanate groups is prepared, mercapto compounds having tertiary SH groups, such as, for example, tert-dodecyl mercaptan, are used as regulators. If mercaptoethanol is used as a regulator in the preparation of an acrylate copolymer having activated ester groups, the polymerization temperature should as far as possible not exceed 80°–90° C.

It is also necessary to use initiators in the polymerization. Peroxy esters and/or azo compounds are particularly suitable initiators. The choice of the initiator depends on the amount of ethylenically polyunsaturated monomers employed. Where this amount is small, the initiators conventionally used for such temperatures, such as, for example, peroxy esters, can be used. For a larger amount of ethylenically polyunsaturated monomers, azo compounds are preferably employed as initiators.

The polymerization for the preparation of the soluble acrylate copolymer is carried out in such a way that a solution of the polymer which has a solids content of from 40 to 65% by weight results. After the polymerization, the polymer solution is concentrated to the desired solids content, preferably to solids contents of 60% by weight, by distilling off solvent. The clear copolymer solutions thus obtained have a viscosity of from 0.4 to 10 dPa.s after being brought to a solids content of 50% by weight.

The invention furthermore relates to coating agents which contain binders, organic solvents, if appropriate pigments, fillers and conventional assistants and additives and can be cured, if required, by means of catalysts, the said coating agents containing, as essential binders, the soluble, crosslinkable acrylate copolymers described above, and to binders suitable for crosslinking these.

According to the invention, the acrylate copolymers containing isocyanate groups can be crosslinked with a polyalcohol and/or a polyamine. Suitable polyalcohols are all compounds having at least two hydroxyl groups per molecule. Simple diols and polyols, such as ethylene glycol, propanediols, butanediols, glycerol or trimethylolpropane, can be employed. Other suitable polyalcohols are polyesterpolyols and polyacrylatepolyols. Suitable polyamines are all compounds which have, per molecule, at least two amino groups which undergo crosslinking. Polyamidoamines, di- and polyaminoalkyl and -aryl compounds and diethylenetriamine may be mentioned as examples.

The invention furthermore relates to coating agents which contain, as essential binders, soluble acrylate copolymers, which contain monomers possessing activated ester groups and alkoxymethylacrylamides or alkoxymethylmethacrylamides as copolymerized units, and di- or polyamines, which contain at least two primary or secondary amino groups per molecule, and/or a polyalcohol.

Examples of suitable di- or polyamines which undergo crosslinking are 1,2-ethylenediamine, 1,3-propylenediamine, 1,2-butylenediamine, 1,4-butylenediamine, 1,6-hexamethylenediamine, 1,7-heptanediamine, diethylenetriamine, xylylenediamine, 1,2-diaminocyclohexane, 2,2-bis-(4-aminocyclohexyl)-propane and bis-(hexamethylenetriamine). Reaction products of 1 mole of a dialkyl maleate with 3 moles of a diamine are also suitable.

Other suitable di- or polyamines are polyamide resins, for example condensates of dimerized fatty acids and difunctional amines, such as, for example, ethylenediamine. Other polymers containing amino groups include acrylate resins, polyester resins and polyurethane resins.

Suitable polyalcohol components are all compounds having at least two hydroxyl groups per molecule.

The invention furthermore relates to a coating agent which contains, as essential binders, the soluble acrylate copolymer described above and possessing glycidyl groups and compounds having at least two carboxyl groups or at least two primary or secondary amino groups or at least two hydroxyl groups per molecule.

Examples of suitable compounds having at least two carboxyl groups per molecule are acrylate resins which contain carboxyl-containing monomers as copolymerized units. Suitable compounds having at least two primary or secondary amino groups per molecule are the di- or polyamines already mentioned above. Suitable compounds having at least two hydroxyl groups per molecule are low molecular weight di- or polyols, acrylate-ols and polyesterpolyols.

The invention furthermore relates to a process for the preparation of the abovementioned coating agents, wherein the soluble acrylate copolymers described above, together with the crosslinking component and with organic solvents, if appropriate pigments and conventional assistants and additives, are processed to a coating material by mixing and, if appropriate, by dispersing. The cross-linking component is understood as meaning all compounds which contain at least two functional groups which are capable of reacting with the crosslinkable functional groups of the soluble acrylate copolymer.

The invention furthermore relates to a process for the production of a coating, in which the coating agents already mentioned above, with which a catalyst can, if required, be mixed, is applied onto a substrate in the form of a film by spraying, flowcoating, dipping, roller coating, knife coating or painting, and the film is cured to give a firmly adhering coating.

The invention furthermore relates to the substrates coated by the process according to the invention.

The coatings according to the invention possess outstanding properties in respect of the resistance to chemicals, to solvents, to water and to steam. They give good results when tested for resistance to gasoline. Moreover, the films are flexible and corrosion resistant.

The invention is illustrated in detail below with reference to examples:

(A) Preparation of copolymers according to the invention (binder A)

In the examples below, all percentages are precentages by weight and all parts are parts by weight, unless specified otherwise. The solids contents were determined in a through-circulation oven after 1 hour at 130° C. The viscosities were determined using a cone-and-plate viscometer.

(A) Acrylate resin I

The following are initially taken in a 3 l stainless steel kettle:
Initially taken mixture:
  185 parts of butanol
  274 parts of toluene
The initially taken mixture is heated to 80° C., and feed 1 is metered in uniformly in the course of 3 hours:
Feed 1:
  300 parts of methacrylamidoglycolate methyl ether
  275 parts of methyl methacrylate
  250 parts of n-butyl acrylate
  25 parts of acrylic acid
  150 parts of hexanediol diacrylate
  45 parts of mercaptoethanol
  200 parts of butanol Before feed mixture 1 is used, the mixture is carefully heated to 30° C., a small amount of insoluble by-products of methacrylamidoglycolate methyl ether is filtered off, and the clear filtrate is used as feed 1. Feed 2 is metered in over 3.5 hours.

Feed 2:
36 parts of 2,2'-azobis-(2-methylbutyronitrile)
60 parts of butanol
84 parts of toluene The temperature during the polymerization is kept at 80° C., and polymerization is continued for 5 hours at 70° C. after the addition of the initiator is complete.

The acrylate resin solution thus obtained has a solids content of 49.2%, an acid number of 36.9 and a viscosity of 6.2 dPa.s (original). The dispersity of the acrylate resin solution is 13.34, according to gel permeation chromatography.

Preparation of a polyamine crosslinking agent A

The following are mixed in a 3 l stainless steel kettle:
957 parts of toluene
510 parts of isophoronediamine The mixture is heated to 75°-80° C., and
144 parts of dimethyl maleate
are metered in at this temperature in the course of 2.5 hours. Thereafter, the kettle content is slowly heated to 128° C. in the course of 6 hours,
1014 parts of a mixture of toluene and methanol distilling off.

A further
450 parts of toluene are added to the product,
and distillation is carried out again. Solvent residues are removed at 80° C. in vacuo. The product thus obtained is dissolved in
597 parts of ethanol;
the solution of the crosslinking agent has a solids content of 49.5%, a viscosity of 0.6 dPa.s (original) and an amine equivalent weight of 140±5.

Acrylate resin II

The following are initially taken in a 3 l stainless steel kettle:
Initially taken mixture:
471.5 parts of xylene
943 parts of 1-methoxyprop-2-yl acetate.

The initially taken mixture is heated to 110° C., and the following is metered in uniformly in the course of 3 hours:

Feed 1:
225 parts of methyl methacrylate
375 parts of glycidyl methacrylate
300 parts of styrene
300 parts of n-butyl acrylate
225 parts of hexanediol diacrylate
75 parts of butyl methacrylate
67.5 parts of mercaptoethanol Feed 2 is metered in over 3.5 hours; the two feeds are started simultaneously.

Feed 2:
51 parts of 2,2'-azobis-(2-methylbutyronitrile)
136 parts of 1-methoxyprop-2-yl acetate
68 parts of xylene During the feed, the temperature is kept at 110°±1° C. When feed 2 is complete, polymerization is continued for 3 hours at 110° C. The clear colorless acrylate resin solution thus obtained has a solids content of 49.2% (2 h, 100° C.), a viscosity of 2.3 dPa.s (original) and an epoxide equivalent weight of 615.

(B) Preparation and testing of coatings containing the copolymers according to the invention

EXAMPLE 1

The following components are mixed with one another:
35.7 parts of acrylate resin I
11.9 parts of crosslinking agent A
0.3 part of 2-hydroxypyridine
18.0 parts of n-butanol 200 μm films of the mixture are applied onto glass panels by knife coating and allowed to dry at room temperature.

The following results were obtained after drying for 5 days at room temperature:
Pendulum hardness: 130",
Gasoline test (5'): no softening, no marking,
Double strokes with methyl ethyl ketone: 200.

EXAMPLE 2

The following components were mixed:
25.4 parts of acrylate resin solution II
8.2 parts of crosslinking agent A
1.0 part of n-butanol
1.4 parts of 2-ethylhexanol 200 μm films of the mixture were applied onto glass panels by knife coating and baked for 20 minutes at 130° C.

Pendulum hardness after baking: 119".
Gasoline test (5'): no softening, very slight marking (reversible after 10 minutes).

EXAMPLE 3

The pigment paste based on the formulation below is dispersed for 40 minutes in a laboratory sand mill.

| Paste A | |
| --- | --- |
| Acrylate resin II | 50.0 |
| Titanium dioxide (rutile) pigment | 40.0 |
| Sheet silicate | 0.5 |
| Xylene | 4.5 |
| Methoxypropyl acetate | 5.0 |

A topcoat is prepared according to the formulation below, applied onto glass sheets by means of a knife coater (thickness of dry layer 40 μm), dried at room temperature or under forced conditions for 30 minutes at 60° C., stored for 1 day at room temperature and then tested.

| | |
| --- | --- |
| Paste A | 60.0 |
| Acrylate resin II | 30.0 |
| Xylene | 4.0 |
| Methoxypropyl acetate | 4.0 |
| Silicone oil solution | 2.0 |
| Reaction product of 1 mole of dimethyl maleate with 3 moles of isophoronediamine | 18.7 |

Results:

| Drying: | 30 min 60° C. | Room temperature |
| --- | --- | --- |
| Layer thickness: | 40 μm | 40 μm |
| Pendulum hardness after 1 day | 53 sec | 25 sec |
| Resistance to gasoline after 1 day | slight marking | slight marking |

We claim:

1. A coating composition comprised of a primary binder curable by a catalyst, and containing a soluble addition copolymer obtained by copolymerization of monomers (a1), (a2) and (a3) and wherein:

(a1) is a monomer comprising 5 to 30% by weight of the total monomers having at least two polymerizable olefinically unsaturated bonds and is selected from:
(1) divinyl benzene;
(2) a compound formula:

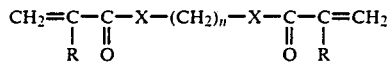

wherein
R represents H or methyl;
X represents O or NR', where R' is H, alkyl or aryl, and
n is 2 to 8;
(3) the reaction product of a carboxylic acid compound having a polymerizable, olefinically unsaturated double bond and glycidyl acrylate or glycidyl methacrylate;
(4) the reaction product of an unsaturated mono- or poly- carboxylic acid esterified with an unsaturated alcohol;
(5) the reaction product of a polyisocyanate and an unsaturated alcohol or amine, or
(6) the diester of polyethylene glycol or polypropylene glycol having a mean molecular weight of less than 1500 and acrylic or methacrylic acid;

(a2) is a monomer comprising 5 to 50% by weight of the total monomers, has a cross-linkable isocyanate, activated ester or amide, or glycidyl group, and is selected from:
(1) a vinyl isocyanate or an isocyanatoalkyl ester of an unsaturated carboxylic acid of the formula:

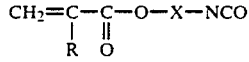

wherein
R represents H, —CH$_3$ or —C$_2$H$_5$ and
X represents —(CH$_2$)—$_{1-12}$;
(2) the reaction product of a diisocyanate with a monomer containing active hydrogens;
(3) a monomer of the formula:

wherein
R represents H or methyl;
R$_1$ represents H, alkyl or aryl;
R$_2$ represents alkyl, and
X represents

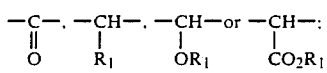

(4) an alkoxymethacrylamide or alkoxymethylmethacrylamide of the formula:

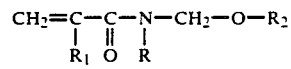

wherein
R$_1$ represents H or methyl;
R$_2$ represents H or alkyl; and
R represents H, alkyl or aryl; or
(5) a copolymer containing glycidyl groups; and (a3) comprises 20 to 92% by weight of the total monomers and is a further monomer having a polymerizable, olefinically unsaturated double bond;
a cross-linker suitable for cross-linking a primary binder; an organic solvent and a pigment.

2. A coating composition as described in claim 1 wherein: (a$_1$) in the primary binder comprises a soluble acrylate copolymer;
the monomers of component (a$_2$) contain isocyanate groups or an isocyanatoalkyl ester of an unsaturated carboxylic acid which corresponds to the formula:

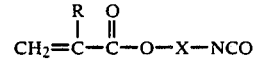

wherein
R represents H, —CH$_3$ or —CH$_2$CH$_3$, and
X represents (CH$_2$)$_n$ with n equal to 1 to 12; and
the coating composition further comprises a polyalcohol or polyamine having at least two primary or secondary amino groups.

3. A coating composition as described in claim 1 wherein the (a$_2$) component of the primary binder comprises
a compound of the formula:

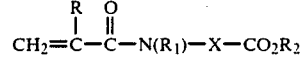

wherein
R represents H or methyl;
R$_1$ represents H, alkyl or aryl;
R$_2$ represents alkyl, and
X represents —C(O)—, —CH(R$_1$)—, —CH(OR$_1$)— or —CH(CO$_2$R$_1$)—;
or the (a$_2$) component of the primary binder is methylacrylamidoglycolate methyl ether, or
the (a$_2$) component of the primary binder is an alkoxymethylacrylamide or an alkoxymethylmethacrylamide of the formula:

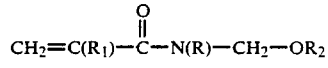

wherein
R$_1$ represents H or methyl;
R$_2$ represents H or alkyl, and
R represents H, alkyl or aryl.

4. A coating composition as described in claim 1 wherein:
the (a$_2$) component of the primary binder contains glycidyl groups, glycidyl esters of unsaturated carboxylic acids or glycidyl ethers of unsaturated carboxylic acids, and the primary binder has at least two carboxyl, primary or secondary amino or hydroxyl groups per molecule.

5. The coating composition of claim 1 wherein the crosslinking agent is a compound having at least two primary or secondary amino groups per molecule.

6. A coating composition of claim 1 wherein the (a1) component is a compound of the formula:

$$CH_2=\underset{R}{C}-\underset{O}{\overset{\parallel}{C}}-X-(CH_2)_n-X-\underset{O}{\overset{\parallel}{C}}-\underset{R}{C}=CH_2$$

with R, X and n as defined therein, said component comprising at least one member selected from the group consisting of: hexanediol diacrylate, hexanediol dimethacrylate, butanediol diacrylate, butanediol dimethacrylate, trimethylol propane triacrylate and trimethylol propane trimethacrylate.

7. A coating composition of claim 1 wherein the a1 component is the reaction product of hexamethylene and allyl alcohol.

8. The coating composition of claim 1 wherein the (a2) component is vinyl isocyanate.

9. The coating composition of claim 1 wherein the (a2) component is comprised of the reaction product of isophorone diisocyanate and a hydroxyl-containing monomer.

10. The coating composition of claim 1 wherein the (a2) component comprises methylacrylamidoglycolate methyl ether.

11. The coating composition of claim 1 wherein the (a2) component comprises methyl methacryloxyacetate.

12. The coating composition of claim 1 wherein the (a2) component is comprised of alkoxymethylacrylamide or alkoxymethylmethacrylamide copolymerized with up to 10% by weight, based on the total weight of all monomers, of a hydroxyl containing monomer or up to 5% by weight, based on the total weight of all monomers, of a carboxyl-containing monomer.

13. The coating composition of claim 1 wherein the (a2) component contains glycidyl groups and comprises a glycidyl ester of an unsaturated carboxylic acid or an unsaturated glycidyl ether.

14. The coating composition of claim 13 wherein the (a2) component is at least one member selected from the group consisting of: glycidyl acrylate, glycidyl methacrylate, a glycidyl ester of maleic or fumaric acid, glycidyl vinyl phthalate, glycidyl allyl phthalate and glycidyl allyl malonate.

15. A coating composition which can be cured by a catalyst comprising:
a primary binder containing a soluble acrylate copolymer obtained by copolymerization of:
(a1) 5 to 30% by weight of monomers having as least two polymerizable olefinically unsaturated double bonds and represented by the formula:

$$CH_2=\underset{R}{C}-\underset{O}{\overset{\parallel}{C}}-X-(CH_2)_n-X-\underset{O}{\overset{\parallel}{C}}-\underset{R}{C}=CH_2$$

in which
R denotes H or CH$_3$;
X denotes O, S or NR', where R' denotes H, alkyl or aryl, and
n denotes 2 to 8;
(a2) from 5 to 50 percent by weight of a monomer having glycidyl groups, glycidyl esters of unsaturated carboxylic acids or glycidyl ethers of unsaturated carboxylic acids;
(a3) from 20 to 92 percent by weight of further monomers having a polymerizable, olefinically unsaturated double bond; the sum of a1, a2 and a3 being 100 percent by weight,
a cross-linker suitable for cross-linking the primary binder;
an organic solvent; and a pigment.

* * * * *